United States Patent [19]

Ruskan et al.

[11] 4,310,490
[45] Jan. 12, 1982

[54] APPARATUS FOR ENRICHING THE IRON CARBONYL CONTENT OF A RECYCLE GAS STREAM

[75] Inventors: Richard P. Ruskan, Houston, Tex.; Humayon Z. Zafar, Wichita, Kans.; Duane N. Goens, Golden, Colo.; David E. Hyatt, Wheatridge, Colo.; Charlie W. Kenney, Lakewood, Colo.

[73] Assignee: Pentanyl Technologies, Inc., Boulder, Colo.

[21] Appl. No.: 192,415

[22] Filed: Sep. 29, 1980

Related U.S. Application Data

[62] Division of Ser. No. 139,422, Apr. 11, 1980, Pat. No. 4,250,157.

[51] Int. Cl.³ .............................. B01J 3/04; B01J 8/04
[52] U.S. Cl. .................................... 422/188; 422/200; 422/208; 422/235
[58] Field of Search ............... 422/188, 200, 201, 235, 422/208; 423/149, 417; 25/0.5 BA; 252/372

[56] References Cited

U.S. PATENT DOCUMENTS

| | | | |
|---|---|---|---|
| 1,614,625 | 1/1927 | Muller-Cunradi | 423/417 |
| 1,783,744 | 12/1930 | Mittasch et al. | 423/417 |
| 1,828,376 | 10/1931 | Muller-Cunradi | 423/417 |
| 2,086,881 | 7/1937 | Schlecht et al. | 423/154 |
| 2,378,053 | 6/1945 | Wallis et al. | 423/138 |
| 3,112,179 | 11/1963 | Schmeckenbecher | 423/417 |

Primary Examiner—Bradley Garris
Attorney, Agent, or Firm—Dennis K. Shelton; Bruce G. Klaas

[57] ABSTRACT

A method and apparatus for enriching the iron carbonyl content of a recycle gas stream produced in an iron carbonyl decomposition or reaction process to enable reuse of the recycle gas stream in the iron carbonyl decomposition or reaction process by cooling the recycle gas stream, adding carbon monoxide to the recycle gas stream, compressing the recycle gas stream to a pressure of about 20 to about 38 atmospheres under conditions suitable to prevent substantial decomposition of residual iron carbonyl, and contacting the compressed gas stream at a temperature of about 65° to about 160° C. with a reduced iron containing material in the presence of hydrogen sulfide under conditions suitable to produce substantially condensed iron carbonyl. In a particularly preferred embodiment, the recycle gas stream is initially split into first and second portions, the first portion of the recycle gas stream is cooled, enriched with carbon monoxide, compressed and contacted with the reduced iron containing material to produce substantially condensed iron carbonyl, and at least a portion of the condensed iron carbonyl is vaporized and then combined with the second portion of the recycle gas stream to produce an iron carbonyl enriched gas stream. The iron carbonyl enriched gas stream may then be reintroduced into the iron carbonyl decomposition or reaction process.

15 Claims, 1 Drawing Figure

APPARATUS FOR ENRICHING THE IRON CARBONYL CONTENT OF A RECYCLE GAS STREAM

This is a division of application Ser. No. 139,422, filed Apr. 11, 1980 now U.S. Pat. No. 4,250,157.

BACKGROUND AND SUMMARY OF THE INVENTION

This invention relates to a method and apparatus for enriching the iron carbonyl content of a recycle gas stream, and more particularly to a method and apparatus for receiving a recycle gas from an iron carbonyl decomposition or reaction process and enriching the iron carbonyl content with the gas to enable reuse of the gas stream in the iron carbonyl decomposition or reaction process.

It has previously been suggested that highly pure metallic iron may be produced under the proper conditions by passing carbon monoxide over reduced iron containing material to form iron carbonyl, and then decomposing the iron carbonyl to deposit iron and release the carbon monoxide. More recently, it has been suggested that iron carbonyl decomposition or reaction processes may be useful in the desulfurization of hydrocarbons such as disclosed in U.S. Pat. No. 2,756,182, in the removal of sulfur during the gasification of coal, such as disclosed in U.S. Pat. No. 2,691,573, in the desulfurization of petroleum crude and primary refinery products, such as disclosed in U.S. Pat. No. 3,996,130, in the removal of pyrite and ash from coal, such as disclosed in U.S. Pat. No. 3,938,966, and in the removal of organic sulfur from coal, such as disclosed in U.S. Pat. No. 4,146,367.

A typical process for producing a metallic carbonyl entails passing carbon monoxide, or gases containing a substantial portion of carbon monoxide, over the metal of which the carbonyl is to be formed. The metal to be acted upon by carbon monoxide is typically obtained by gaseous reduction of an oxide of the metal. Although other carbonyls may be formed in this manner, substantial commercial production appears to have been limited to nickel carbonyl, since the reaction may take place at relatively low pressure and temperatures, as for example at atmospheric pressure and a temperature of about 40° C. to about 50° C. Iron carbonyl, on the other hand, is much more difficult to form, and is typically produced by the reaction of carbon monoxide with iron generally obtained by the reduction of iron ore, but at temperatures and pressures much higher than are required for the production of nickel carbonyl from reduced nickel. For example, temperatures on the order of 175° C. or higher and pressures in the range of from 100 to 200 atmospheres, or even as high as 2,000 atmospheres, have been employed in attempts to make the reaction proceed sufficiently rapidly to make iron carbonyl production efficient.

Several attempts have been made to efficiently produce iron carbonyl by modifying reaction conditions. For example, U.S. Pat. No. 1,614,625 discloses a process for producing iron carbonyl by passing carbon monoxide under a pressure of about 200 atmospheres over iron metal at a temperature of about 200° C. U.S. Pat. No. 1,759,268 discloses a process for producing iron carbonyl by passing carbon monoxide at a pressure of about 50 atmospheres or more over reduced oxides of iron at a temperature of about 100 to about 200° C. at a sufficient velocity to prevent deposition of iron carbonyl on the iron oxide material. U.S. Pat. No. 1,783,744 discloses a similar process wherein higher gas velocities are utilized in conjunction with lower reaction temperature and pressure conditions. U.S. Pat. No. 1,828,376 also utilizes high gas velocities to produce iron carbonyl by passing carbon monoxide at a pressure of between 50 and 120 atmospheres over porous iron lumps at a temperature between 90° and 100° C.

Other attempts at the efficient production of iron carbonyl have utilized modified reaction materials. For example, U.S. Pat. No. 2,086,881 discloses a process for producing iron and nickel carbonyl from sulfur bearing matte materials preferably between 140° and 300° C. and at pressures preferably of 50, 100 or 200 atmospheres or even more. U.S. Pat. No. 3,112,179 discloses a process for preparing iron and nickel carbonyl by mixing nickel oxide powder with sponge iron to form a mixture containing 50 to 98% by weight of sponge iron and 50 to 2% by weight of nickel oxide powder, pelletizing the mixture, reducing the oxides in the pellets, and then passing a stream of carbon monoxide through the pellets at a temperature of 70° to 170° C. while maintaining the carbon monoxide pressure at a sufficiently high level to prevent substantial decomposition of nickel carbonyl.

Still other attempts at efficiently producing iron carbonyl have suggested that the presence of sulfur in an active form may increase the efficiency of iron carbonyl production. However, the form of the sulfur bearing material utilized in such a process appears to be critical in determining efficiency of iron carbonyl production. For example, as disclosed in U.S. Pat. No. 2,378,053, ". . . although as has been recognized, sulfur in the form of sulfides such as nickel sulfide is effective to increase the velocity of the reaction involved in the production of nickel carbonyl from reduced nickel, nevertheless the addition of solid sulfides to reduced iron such as described hereinbefore is not effective. Furthermore, gaseous sulfides have been found to be ineffective also in view of the fact that there is an excessive local action near the inlet port for the gaseous sulfides and relatively ineffective action at points remote from the gas inlet. Thus, it is manifest that sulfides are not effective in increasing the velocity of the reaction between iron and carbon monoxide to produce iron carbonyl". U.S. Pat. No. 2,378,058 then discloses that the reaction between reduced iron and carbon monoxide can be accelerated by treating the iron containing material with a soluble solution of heavy metal sulfates prior to reduction of the iron containing material.

While the basic reaction of carbon monoxide gas with reduced iron containing material to form iron carbonyl has been known for many years, the prior art processes for production of iron carbonyl have not proceeded with sufficient efficiency to enable substantial commercial production, or have entailed economically prohibitive reaction conditions or material treatment prior to production. Thus, several proposed industrial processes involving the decomposition or reaction of iron carbonyl, as heretofore described, have not been commercially feasible.

It has now been determined that iron carbonyl may be produced in a highly efficient manner enabling its use on a commercial scale in an iron carbonyl decomposition or reaction process by cooling a recycle gas stream produced in an iron carbonyl decomposition or reaction process to a temperature of about 5° to about 15° C., adding carbon monoxide to the cooled gas stream to produce a carbon monoxide enriched gas stream, compressing the carbon monoxide enriched gas stream to a pressure of about 20 to about 38 atmospheres under conditions suitable to prevent the decomposition of substantial amounts of iron carbonyl in the carbon monoxide enriched gas stream, and contacting the compressed gas stream at a temperature of about 65° to about 160° C. with a reduced iron containing material in the presence of an iron carbonyl production enhancing amount of hydrogen sulfide under conditions suitable to producing substantially condensed iron carbonyl. Preferably, the recycle gas stream is split into first and second portions, the first portion is cooled, enriched with carbon monoxide, compressed and contacted with the reduced iron containing material to produce substantially condensed iron carbonyl, and at least a portion of the condensed iron carbonyl is vaporized and combined with the second portion of the recycle gas stream to produce an iron carbonyl enriched recycle gas stream. The iron carbonyl enriched recycle gas stream may then be reintroduced into the iron carbonyl decomposition or reaction process.

DESCRIPTION OF THE PRESENTLY PREFERRED EMBODIMENTS

Figure 1:
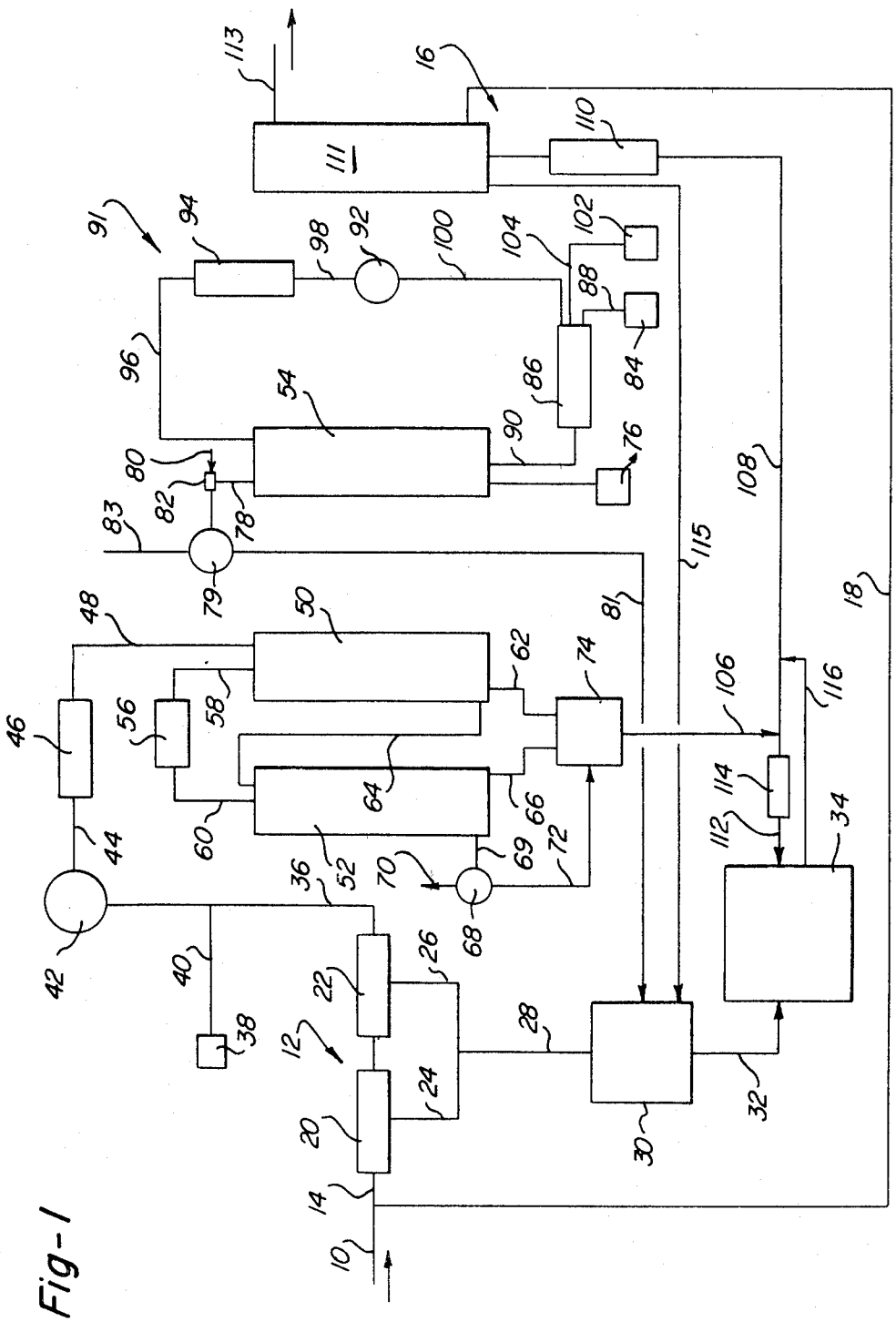
FIG. 1 is a schematic drawing of the process and apparatus of an illustrative embodiment of the present invention.

As used herein, the term "iron carbonyl" means iron compounds containing a plurality of carbonyl groups. Although it is presently thought that the predominate form of iron carbonyl produced by the process of the invention and present in the recycle gas stream is iron pentacarbonyl, $Fe(CO)_5$, it is further expected that lesser amounts of other iron carbonyls, such as iron butacarbonyl, $Fe(CO)_4$, iron nonacarbonyl, $Fe_2(CO)_9$, iron dodecacarbonyl, $Fe_3(CO)_{12}$, etc., may be present both in the condensed iron carbonyl and in the recycle gas stream. All such compounds are intended to be included in the term "iron carbonyl". Although it is not fully understood at this time, it may be possible that the equilibrium existing between various iron carbonyl forms under the process conditions disclosed herein may contribute to both enhanced iron carbonyl yields and effectiveness of the recycle gas stream in the iron carbonyl decomposition or reaction process.

Recycle gas to be treated according to the process of the present invention can be any by-product gas produced as a result of an iron carbonyl reaction or decomposition process. For example, the recycle gas may be produced by reaction iron carbonyl with iron disulfide to produce "iron-rich disulfide" in the coal beneficiating process disclosed in U.S. Pat. No. 3,938,966 of Kindig et al., by reacting the iron carbonyl with coal to obtain organic sulfur removal, or from other processes in which iron carbonyl is reacted or decomposed to form iron or iron compounds and carbon monoxide. A typical recycle gas stream suitable for use in connection with the inventive concepts comprises residual, unreacted or undecomposed iron carbonyl, carbon monoxide produced in the iron carbonyl reaction or decomposition process, and possibly other by-product or leakage gases such as nitrogen, carbon dioxide, hydrogen and water vapor. The recycle gas stream may comprise, for example, about 0.0 to about 10%, more preferably about 1 to about 8%, and most preferably about 4 to about 6% by volume residual iron carbonyl.

Although the recycle gas stream may be processed as a whole in accordance with the inventive concepts, it is a presently particularly preferred embodiment to initially split the recycle gas stream into at least first and second portions, to treat one portion to produce iron carbonyl and then to recombine the separate portions of the recycle gas stream. Thus, although the inventive concepts are hereinafter described in connection with a split recycle gas stream, it is to be understood that the recycle gas stream may also be processed as a whole. In accordance with the foregoing, the recycle gas stream is initially split into two portions, a first portion of which is processed, as hereinafter further described, to produce additional iron carbonyl, and a second portion which is enriched with vaporized iron carbonyl and returned directly to the iron carbonyl reaction or decomposition process.

The first portion of the recycle gas stream is treated by cooling the first portion to a temperature of about 5° to about 15° C., preferably about 10° C. During cooling, a portion of the iron carbonyl and water in the gas stream is condensed, and the liquid iron carbonyl is recovered and stored for subsequent use. Carbon monoxide is then added to the cooled gas stream to form a carbon monoxide enriched recycle gas stream.

The carbon monoxide enriched gas stream is compressed to a pressure of about 20 to about 38 atmospheres, more preferably about 27 to about 36 atmospheres, and most preferably about 30 to about 34 atmospheres, under conditions suitable to prevent the decomposition of a substantial amount of the iron carbonyl remaining in the gas stream. Iron carbonyl in the carbon monoxide enriched gas stream may decompose under certain combinations of gas stream temperature, pressure and iron carbonyl content. In particular, decomposition of iron carbonyl may occur during compression of the carbon monoxide enriched gas stream due to a temperature rise resulting from the adiabatic heat of compression and/or the heat of mechanical inefficiency of the compressor. However, it has been found that iron carbonyl decomposition can be substantially reduced by compressing the gas stream in multiple stages with interstage cooling of the gas stream to a temperature of about 5° to about 15° C. In a presently particularly preferred embodiment, the gas stream is compressed to the desired degree in four separate stages with relatively low initial stage compression ratios and with interstage cooling to a temperature of about 10° C.

After compression, the first portion of the recycle gas stream is contacted with an activated, reduced iron containing material at a temperature of about 65° to about 160° C., more preferably about 125° to about 150° C., and most preferably about 130° to about 135° C. Suitable iron containing materials include all iron containing materials in which the iron is capable of being reduced to a high degree. For example, sponge iron has been found to be particularly well suited as an iron containing material in the process of the invention due to its partially prereduced condition and commercial availability, although other iron containing materials may be employed.

In order to activate the sponge iron, or other iron containing material, the sponge iron is charged into a sealable vessel and the vessel is sealed and evacuated or purged, such as with a steam ejector, vacuum device, suitable purge gas or the like. The sponge iron is then preheated to a temperature of about 600° to about 760° C., preferably to about 650° C. at a pressure of about 2 to about 3 atmospheres, such as by passing heated nitrogen through the sealed vessel. When the sponge iron has been preheated to the desired temperature level, a reducing gas, such as hydrogen, carbon monoxide or mixtures thereof, is slowly passed through the column to further reduce the sponge iron and to activate the sponge iron for subsequent reaction with the compressed recycle gas stream. Due to its greater ability to reduce iron at a given temperature level, hydrogen, and reducing gases comprising a relatively large hydrogen concentration, are the presently preferred reducing gas for use in connection with the present invention. Water vapor and other gaseous materials produced during sponge iron reduction, together with unconsumed hydrogen, are purged from the top of the sealed vessel. When the purged gas stream no longer evidences the production of additional water vapor or carbon dioxide, the sponge iron is cooled to the desired reaction temperature of about 65° to about 160° C., more preferably about 125° to about 150° C., and most preferably to about 130° to about 135° C., under a protective blanket of the reducing gas or other inert gas to prevent oxidation of the reduced sponge iron. Final activation of the sponge iron is then obtained by charging the sponge iron in the vessel with an iron carbonyl production enhancing amount of hydrogen sulfide. Effective amounts of hydrogen sulfide have been found to be about 0.2% to about 0.4%, preferably about 0.3%, of sulfur per unit of sponge iron in the vessel, when diluted, for example, in the cooling blanket of reducing or inert gas. The activated, reduced sponge iron, or other iron containing material is then contacted with the compressed, carbon monoxide enriched recycle gas stream at a temperature of about 65° to about 160° C., more preferably about 125° to about 150° C., and most preferably about 130° to about 135° C., and at a pressure of about 20 to about 38 atmospheres, more preferably about 27 to about 36 atmospheres, and most preferably about 30 to about 34 atmospheres, by slowly passing the compressed recycle gas stream over the sponge iron to produce iron carbonyl, predominately by the reaction:

$$Fe + 5CO \rightleftharpoons Fe(CO)_5$$

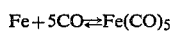

The exothermic heat of reaction formed during iron carbonyl production is removed to maintain the sponge iron at the desired temperature level.

It is critical to the efficient operation of the present process that the operating carbonylation temperature for any given pressure be maintained at a level less than that at which phase equilibria and chemical equilibria commonly exist. If the operating temperature exceeds this critical level, a reverse carbonylation reaction may occur. If the operating temperature is approximately equal to this critical level, the forward carbonylation reaction will proceed until iron carbonyl gas saturation is obtained, at which point chemical equilabria is reached and the forward reaction will substantially stop. If the operating temperature is maintained below this critical level, the forward carbonylation reaction proceeds, iron carbonyl gas saturation is ultimately reached, and thereafter iron carbonyl condenses, favoring continuation of the forward reaction since chemical equilibria is not obtained. Based upon current information, it appears that the critical temperature levels for various given pressure levels are as follows:

TABLE I

| Pressure (Atmospheres) | Critical Temperature (°C.) |
| --- | --- |
| 20 | 132 |
| 27 | 146 |
| 30 | 148 |
| 34 | 157 |
| 36 | 158 |
| 38 | 159 |

It has been found that a majority of the iron carbonyl formed in the vessel condenses under the foregoing reaction conditions providing a driving force for the forward iron carbonyl generation reaction, while not substantially impeding the kinetic mechanism which is generally thought to require migration of carbon monoxide molecules to active iron sites. The reaction vessel is preferably sized and designed so that substantially all of the carbon monoxide in the compressed gas stream is converted to iron carbonyl. After contacting the compressed gas stream with sponge iron in the reaction vessel, the gas stream, comprising various inert gases, carbon monoxide and iron carbonyl is cooled, such as in a tail gas cooler, to condense and recover additional iron carbonyl.

The activity of the iron containing material in the reaction vessel has been found to decrease over time due to phenomena which are not completely understood, but which may result from reaction of iron in the iron containing material with trace quantities of oxygen in the compressed recycle gas stream, from a build-up of carbon on the iron bed, or from the physical blocking of active iron sites by substances such as hydrocarbon material which are typically present in carbon monoxide containing synthesis gas. It has been determined that any such decrease in iron activity can be at least partially reversed by the presence of iron carbonyl production enhancing amounts of hydrogen sulfide during the carbonylation reaction. Enhancing amounts of hydrogen sulfide may be maintained in the reaction vessel by the intermittent or continuous injection of hydrogen sulfide into the compressed recycle gas stream or by the utilization of trace hydrogen sulfide and other effective sulfur containing gases which may be present in the carbon monoxide synthesis gas. In extreme cases where the carbonylation reaction has resulted in substantial deactivation of the iron containing material, it has been determined that restoration of activity may be obtained by further reduction of the iron containing material with reducing gas, as hereinbefore described, followed by reactivation with hydrogen sulfide.

The condensed iron carbonyl produced according to the foregoing process is then vaporized and combined with the second portion of the recycle gas stream to provide an iron carbonyl enriched gas stream comprising, for example, about 5 to about 20%, more preferably about 6 to about 14%, and most preferably about 8 to about 12%, by volume iron carbonyl, for reuse in the iron carbonyl reaction or decomposition process. Vaporization of the condensed iron carbonyl may be obtained, for example, by heating the condensed iron carbonyl to a temperature of about 105° to about 140° C. under a pressure of, for example, about 32 atmospheres, and thereafter reducing the pressure to about 1 atmosphere while introducing the iron carbonyl into the second portion of the recycle gas stream, whereby the iron carbonyl is simultaneously vaporized and combined with the second portion of the recycle gas stream.

The foregoing process may be more fully understood in connection with FIG. 1, which is a schematic drawing of a presently preferred embodiment of the apparatus of the invention. A by-product gas stream produced by an iron carbonyl reaction or decomposition process and to be treated by the system of the present invention is introduced into the treatment system through recycle gas input conduit means 10. The recycle gas is split into a first portion which is transferred to cooling means 12 through conduit means 14, and a second portion which is transferred to iron carbonyl vaporization means 16 through conduit means 18.

Cooling means 12 for cooling the first portion of the recycle gas stream to a temperature of about 5° to about 15° C., preferably about 10° C., may comprise two or more separate gas coolers 20, 22, as shown in FIG. 1, or may comprise a single gas cooler. In the illustrative embodiment of FIG. 1, cooling means 12 is particularly adapted to receiving an input recycle gas stream at temperatures on the order of 185° C., or higher, and cooling the gas stream to temperatures on the order of 50° C. in the first gas cooler 20 and to the desired temperature of about 5° to about 15° C. in the second gas cooler 22. During cooling of the recycle gas, a portion of the iron carbonyl in the recycle gas will condense in the coolers 20, 22. Any such condensed iron carbonyl is recovered from the coolers 20, 22 and transferred through conduit means 24, 26, respectively, and conduit means 28 to intermediate iron carbonyl collection means 30, and through conduit means 32 to iron carbonyl storage means 34 for subsequent use, as will be hereinafter further described.

After cooling to the desired temperature, the cooled recycle gas is transferred out of gas cooler 22 through conduit means 36. A carbon monoxide containing gas is introduced into the cooled recycle gas stream from carbon monoxide source 38 through conduit means 40 to produce a carbon monoxide enriched recycle gas stream in the conduit means 36. The carbon monoxide enriched recycle gas stream is then transferred through the conduit means 36 to recycle gas compressor means 42.

The system further comprises recycle gas compressor means 42 for compressing the carbon monoxide enriched recycle gas to a pressure of about 20 to about 38 atmospheres under conditions suitable to prevent the decomposition of a substantial amount of iron carbonyl in the carbon monoxide enriched recycle gas stream. As previously set forth, iron carbonyl decomposition is minimized by compressing the recycle gas stream in multiple stages with interstage cooling of the partially compressed gas stream. In a presently particularly preferred embodiment, recycle gas compressor means 42 comprises a four stage recycle gas compressor having a relatively low first stage compression ratio of, for example, about 1.6, a relatively high last stage compression ratio of, for example about 3.9, and incrementally increasing intermediate stage compression ratios of, for example, about 2.1 and 2.8, respectively. The compressor means 42 further comprises three interstage gas coolers (not shown) adapted to cool the partially compressed recycle gas stream to a temperature of about 5° to about 15° C. between the individual stages of the recycle gas compressor, the recycle gas stream being transferred out of the compressor means through conduit means 44 at a temperature of about 185° to about 190° C.

Cooling means 46 is provided in the system for receiving the compressed carbon monoxide enriched recycle gas stream from the compressor means 42 through conduit means 44 and for cooling the recycle gas stream to the desired carbonylation temperature of about 65° to about 160° C. After cooling, the recycle gas stream is transferred through conduit means 48 to an activated reduced iron containing material filled reaction chamber means formed by a suitable reaction vessel, such as reaction vessel 50, for carrying out the carbonylation reaction.

In the illustrative, presently preferred embodiment of FIG. 1, the system comprises three separate reaction chamber means formed by reaction vessels 50, 52, 54, with the reaction vessels 50, 52 being shown on stream in the production of iron carbonyl, and the reaction vessel 54 being shown as used for iron containing material reduction, as is hereinafter further described. In this manner, the production of iron carbonyl according to the present invention may be operated continuously by simultaneously activating and reducing iron containing material in, for example, reaction vessel 54, while carrying out iron carbonyl production in, for example, reaction vessels 50, 52. Then, when the reduced iron content of, for example, reaction vessel 50 becomes substantially depleted, the reaction vessel 50 may be taken off stream, the functional position of reaction vessel 52 can be shifted to that previously occupied by reaction vessel 50, the reaction vessel 54 containing newly reduced iron containing material may be placed on stream in the functional position previously occupied by reaction vessel 52, and the reaction vessel 50 may be filled with fresh iron containing material and placed in the reduction cycle in the functional position previously occupied by reactor vessel 54. Although illustrative embodiment of FIG. 1 is presently particularly preferred in that it permits continuous operation of the system by rotation of the functional position of reaction vessels 50, 52, 54, it is contemplated that the inventive concepts may be employed in a batch or continuous system utilizing one or two reaction vessels, or in a batch or continuous system utilizing four or more reaction vessels.

From the foregoing, it is apparent that the system of the invention further comprises means, such as reaction vessels 50, 52, for receiving compressed carbon monoxide enriched recycle gas from cooler means 46 and for providing a reaction chamber containing activated, reduced iron containing material wherein the iron containing material is contacted with the compressed recycle gas at a temperature of about 65° to about 160° C., more preferably about 125° to about 150° C., and most preferably about 130° to about 135° C., and at a pressure of about 20 to about 38 atmospheres, more preferably about 27 to about 36 atmospheres, and most preferably about 30 to about 34 atmospheres. The reaction vessels 50, 52, 54 are preferably of vertically oriented, cylindrical design so as to form reaction columns. For example, the reaction columns may be about 3 feet in diameter, about 22 feet in length, provided with coils or the like adapted for the passage of steam or water therethrough to cool the reduced iron containing material and to maintain the reaction temperature within desired limits, as hereinafter further described, and adapted to withstand both the reduction and carbonylation temperature and pressure conditions of the process.

The temperature of vessels 50, 52 is adjusted, for example, to about 65° C. to about 160° C. at a pressure of about 20 to about 38 atmospheres by passing steam through coils in the reaction vessels, and then an iron carbonyl production enhancing amount of hydrogen sulfide from hydrogen sulfide supply source 56 is introduced into the vessels 50, 52 through conduit means 58, 60. The compressed, carbon monoxide enriched gas is then introduced into the top of reaction vessel 50 through conduit means 48 and allowed to pass slowly downwardly through the reaction vessel where it contacts the activated, reduced iron containing material and reacts with the material to form iron carbonyl. Excess heat produced by the exothermic heat of reaction is removed from the reaction vessel, such as by passing water or the like through the coils in the reaction vessel. A majority of the iron carbonyl formed in reaction vessel 50 condenses under the foregoing carbonylation conditions, and is removed from reaction vessel 50 through conduit means 62. Any unreacted gas, vaporized iron carbonyl, and other tail gases, are removed from the bottom of reaction vessel 50 and transferred to the top of reaction vessel 52 through conduit means 64. The tail gases from reaction vessel 50 are then passed slowly downwardly through reaction vessel 52 where they are allowed to contact the activated, reduction iron containing material in reaction vessel 52 under the same reaction conditions and react with the material to form additional iron carbonyl. Similarly to reaction vessel 50, excess heat produced by the exothermic heat of reaction is removed from reaction vessel 52. A majority of the newly formed iron carbonyl condenses in the reaction vessel 52 and is removed from the bottom of the reaction vessel 52 through conduit means 66. The apparatus may further comprise tail gas cooler means 68 for receiving tail gas from reaction vessel 52, such as through conduit means 69 and cooling the tail gas to condense additional iron carbonyl. Uncondensed gases are transferred away from cooler means 68 through conduit means 70 for subsequent treatment prior to discharge or disposal, while condensed iron carbonyl is recovered and removed from the cooler means through conduit means 72.

Condensed iron carbonyl recovered from reaction vessels 50, 52 and tail gas cooler means 68 is transferred through conduit means 62, 66, 72 and received by receiver means 74 for receiving the condensed iron carbonyl and maintaining the iron carbonyl at a temperature and pressure level about equal to that within reaction vessels 50, 52.

The presently preferred, illustrative embodiment shown in FIG. 1 further comprises reaction vessel 54, which is shown as used for iron containing material reduction in FIG. 1. The reaction vessel 54, having been previously utilized in the carbonylation cycle for the production of iron carbonyl, contains material having a substantially reduced metallic iron content. The reaction vessel 54 is depressurized and slowly and carefully purged with air from air supply means 76 to deactivate the iron heel, to destroy residual iron carbonyl, and to cool the iron heel in the reaction vessel. The purged gases are removed from the vessel through conduit means 78 and passed through condenser means 79 for condensing any residual iron carbonyl from the purge gas stream. Any condensed iron carbonyl is transferred from condensor means 79 to iron carbonyl collection means 30 such as through conduit means 81, while the substantially iron carbonyl free purge gas stream is removed from the condenser means 79 such as through conduit means 83 for subsequent treatment prior to discharge into the atmosphere. Upon determination that no iron carbonyl remains in the reaction vessel 54, the spent iron containing material is discharged from the vessel and the vessel is filled with suitable, fresh iron containing material, such as sponge iron or the like. The filled vessel is then sealed and air is evacuated from the vessel through conduit means 78, such as by introducing steam through conduit means 80 into ejector means 82.

The system further comprises heater means, such as nitrogen supply source 84, heater 86 and interconnecting conduit means 88, 90, for heating the iron containing material to a temperature sufficient for enabling efficient reduction of the iron containing material. It has been found that the iron containing material may be efficiently reduced at temperatures of about 620° to about 760° C., preferably about 650° C. In the illustrative embodiment of FIG. 1, nitrogen from nitrogen supply source 84 is transferred through conduit means 88 into heater 86 and then through conduit means 90 into reaction vessel 54, where the heated nitrogen heats the iron containing material to the desired temperature level. In order to conserve nitrogen, nitrogen recycle means 91 may additionally be provided for recycling the nitrogen from the vessel through the heater and back into the vessel. In the illustrative embodiment of FIG. 1, the nitrogen recycle means comprises pump means 92, nitrogen cooler means 94 for receiving heated nitrogen from the vessel 54 and cooling the nitrogen during the last portions of the heating cycle to a temperature within the operating limits of the pump means 92, and conduit means 96, 98 and 100 operatively interconnecting vessel 54, nitrogen cooler means 94, pump means 92 and heater 86. When the iron containing material has been heated to the desired level, the nitrogen supply is closed off and a reducing gas, such as hydrogen, heated to a temperature of about 620° to about 750° C., preferably about 650° C., is introduced into the vessel 54, such as from hydrogen supply source 102, through conduit means 104, heater 86 and conduit means 90, to reduce the iron in the iron containing material to a highly metalized state. Water vapor produced during iron reduction, and unconsumed hydrogen, are purged from the reaction vessel 54, such as through conduit means 78. When the desired degree of iron reduction has been obtained in reaction vessel 54, the vessel 54 is ready to be used for the production of iron carbonyl, as heretofore described.

From the foregoing, it is apparent that the system of the invention provides for continuous production of iron carbonyl by utilizing two reaction vessels, such as vessels 50, 52 for iron carbonyl production while simultaneously reducing fresh iron containing material in a third reaction vessel, such as reaction vessel 54. In this manner, when the metalized iron content of the material in one carbonylation vessel, such as vessel 50, becomes substantially depleted, it may be pulled off-line from the carbonylation process, replaced in functional position by the second carbonylation vessel, such as vessel 52, while the newly reduced reaction vessel, such as vessel 54, is brought in line in the carbonylation process in the functional position formerly held by the vessel 52, all without substantial interruption of the iron carbonyl production process.

The apparatus further comprises vaporization means 16 for vaporizing the condensed iron carbonyl and recombining the vaporized iron carbonyl with the second portion of the recycle gas stream to produce an iron carbonyl enriched gas stream for use in the iron carbonyl decomposition or reaction process. As shown in FIG. 1, condensed iron carbonyl recovered from reaction vessels 50, 52 and collected in receiver means 74 is transferred from the receiver means to the vaporization means 16 through conduit means 106, 108. Vaporization means 16 comprises heater means, such as heater 110, in the conduit means 108 for preheating the condensed iron carbonyl to a temperature of about 105° to about 140° C., at a pressure of about 20 to about 38 atmospheres, and vaporization column means 111 for receiving iron carbonyl from heater 110, reducing the pressure of the iron carbonyl to about 1 atmosphere to vaporize the iron carbonyl and combining the vaporized iron carbonyl with the second portion of the recycle gas stream. Preheated iron carbonyl from heater 110 is introduced into the vaporization column means and is vaporized therein. The second portion of recycle gas is simultaneously introduced into the vaporization column means through conduit means 18 and is combined with the vaporized iron carbonyl in any desired proportions to produce an iron carbonyl enriched gas stream. The enriched gas stream, comprising, for example, 10% iron carbonyl, is transferred out of vaporization means 16 through conduit means 113 and is recycled to the iron carbonyl decomposition or reaction process. Any iron carbonyl which condenses in vaporization column means 111 is collected in a bottom portion thereof and is transferred to iron carbonyl collection means 30 such as through conduit means 115.

During periods of excess iron carbonyl production or vaporization means shut-down, condensed iron carbonyl is transferred from receiver means 74 through conduit means 106, 112 to iron carbonyl storage means 34. Cooling means, such as cooler 114, are preferably provided in the conduit means 112 for cooling the iron carbonyl to a temperature less than about 90° C. prior to transferring the iron carbonyl to the storage means. During periods of iron carbonyl production shortage, make-up iron carbonyl is transferred from storage means 34 to vaporization means 16 through conduit means 106, 108 as required.

While the foregoing process and apparatus have been described in connection with various presently preferred and illustrative embodiments, various modifications may be made without departing from the inventive concepts. All such modifications are intended to be within the scope of the appended claims, except insofar as limited by the prior art.

What is claimed is:

1. An apparatus for enriching the iron carbonyl content of a recycle gas stream comprising residual iron carbonyl and carbon monoxide and produced in an iron carbonyl decomposition or reaction process to enable reuse of the recycle gas stream in the iron carbonyl decomposition or reaction process, comprising:

recycle gas stream splitting means for receiving a recycle gas stream from an iron carbonyl decomposition or reaction process and splitting the gas stream into a first portion and a second portion;

cooler means for cooling the first portion of the recycle gas stream to a temperature of about 5° to about 15° C., thereby condensing at least a portion of the residual iron carbonyl in the gas stream;

carbon monoxide supply means for supplying carbon monoxide to the cooled first portion of the gas stream;

compressor means for compressing the carbon monoxide enriched gas stream to a pressure of about 20 to about 38 atmospheres under conditions suitable to prevent the decomposition of substantial amounts of iron carbonyl in the gas stream;

reaction vessel means containing reduced iron containing material for receiving the gas stream from the compressor means and for providing a reaction chamber wherein the gas stream is contacted with the iron containing material at a temperature of about 65° to about 160° C. at a pressure of about 20 to about 38 atmospheres to produce substantially condensed iron carbonyl;

vaporization means for vaporizing the condensed iron carbonyl;

combination means for combining at least a portion of the vaporized iron carbonyl with the second portion of the recycle gas stream to produce an iron carbonyl enriched recycle gas stream; and fluid communication means providing fluid communication between the recycle gas stream splitting means, the carbon monoxide supply means, the cooler means, the compressor means, the reaction vessel means, the vaporization means and the combination means.

2. The apparatus of claim 1 wherein the cooler means comprises a first gas cooler and a second gas cooler.

3. The apparatus of claim 2 wherein the first gas cooler includes means for cooling the first portion of the recycle gas stream to a temperature of about 50° C.

4. The apparatus of claim 2 wherein the second gas cooler includes means for cooling the first portion of the recycle gas stream to a temperature of about 5° to about 15° C.

5. The apparatus of claim 1 which further comprises collection means for collecting iron carbonyl condensed in the cooler means.

6. The apparatus of claim 1 wherein the compressor means comprises multiple stage compressor means for compressing the carbon monoxide enriched gas stream in multiple compression stages and for cooling the carbon monoxide enriched gas stream between compression stages.

7. The apparatus of claim 6 wherein the multiple stage compressor means comprises a four stage gas compressor.

8. The apparatus of claim 7 wherein the four stage gas compressor has a relatively low first stage compression ratio, a relatively high last stage compression ratio and incrementally increasing intermediate stage compression ratios.

9. The apparatus of claim 6 wherein the multiple stage compressor means includes means for cooling the carbon monoxide enriched gas stream to a temperature of about 5° to about 15° C. between the compression stages.

10. The apparatus of claim 1 wherein the reaction vessel means comprises at least three reaction vessels, at least two of the reaction vessels being adapted to provide the reaction chamber at any one time, and the remaining reaction vessels being adapted to provide a chamber for the reduction of iron containing material.

11. The apparatus of claim 10 wherein the reaction vessels are formed by vertically oriented cylindrical columns.

12. The apparatus of claim 11 wherein the reaction vessels further comprise coils adapted for the passage of steam or water therethrough to cool the reduced iron containing material.

13. The apparatus of claim 10 which further comprises heater means for heating iron containing material in the reaction vessels to a temperature sufficient for enabling reduction of the iron containing material.

14. The apparatus of claim 13 wherein the heater means comprises a nitrogen supply source, a heater and conduit means providing fluid communication between the nitrogen source, the heater and the reaction vessels.

15. The apparatus of claim 1 wherein the vaporization means comprises heater means for heating the condensed iron carbonyl to a temperature of about 105° to about 140° C. at a pressure of about 20 to about 38 atmospheres, and vaporization column means for receiving iron carbonyl from the heater means, reducing the pressure of the iron carbonyl to about 1 atmosphere to vaporize the iron carbonyl and combining the vaporized iron carbonyl with the second portion of the recycle gas stream.

* * * * *